United States Patent
Tremarco

[11] 3,891,169
[45] June 24, 1975

[54] MODEL AIRPLANE ADJUSTABLE MOTOR MOUNT

[76] Inventor: Emelio Tremarco, 17 Speer Pl., Nutley, N.J. 07110

[22] Filed: Jan. 28, 1974

[21] Appl. No.: 437,309

[52] U.S. Cl. ............................................. 248/5
[51] Int. Cl. ............................................. F16m 13/00
[58] Field of Search ........ 248/5, 16, 110, 201, 287, 248/298, 310, 312, 488

[56] References Cited
UNITED STATES PATENTS

| | | | |
|---|---|---|---|
| 1,030,090 | 6/1912 | Johnson | 248/310 |
| 1,073,099 | 9/1913 | Cushman | 248/16 |
| 1,613,031 | 1/1927 | Gifford | 248/16 |
| 1,647,002 | 10/1927 | Hooley | 248/16 X |
| 1,661,592 | 3/1928 | Wright | 248/16 X |
| 1,982,682 | 12/1934 | Masse | 248/16 |
| 2,387,910 | 10/1945 | Ingwer | 248/16 X |
| 2,696,962 | 12/1954 | Goss | 248/488 X |
| 2,709,494 | 5/1955 | Luce | 248/310 X |

*Primary Examiner*—William H. Schultz
*Attorney, Agent, or Firm*—Kenyon & Kenyon Reilly Carr & Chapin

[57] ABSTRACT

An adjustable motor mount for model airplane engines in which a base member is provided having two adjustable jaws slidably mounted in a channel in the base with means for securing the jaws in place, the base also incorporating a central hole which permits ease of mounting of the motor mount along the desired centerline. The adjustable feature permits using a single motor mount for all model airplane engines in the size range of 0.15 cubic inches to 0.80 cubic inches.

14 Claims, 6 Drawing Figures

MODEL AIRPLANE ADJUSTABLE MOTOR MOUNT

BACKGROUND OF THE INVENTION

This invention relates to model airplanes in general and more particularly to an improved adjustable motor mount for use with such model airplanes.

Model airplanes which are powered by miniature glow plug engines are well known in the art. As is also well known, such airplanes can be operated on the end of control lines, in free flight and can be operated in a radio-controlled manner. Before the advent of miniaturized electronic components the former types of flight were more common. However, presently with the availability of small components for constructing receivers and servo systems, the use of model airplane radio-controlled models are becoming more and more widespread. Older models provided mounting for the engines by constructing into the model a pair of parallel hardwood engine mounts which were then drilled to match the mounting holes on the engine after which the engine was secured in place using nuts and bolts. These hardwood motor mounts extended back into the fuselage of the aircraft and in cases where radio-controlled equipment was to be mounted therein created an obstruction. In addition, these hardwood motor mounts were subject to breaking and replacement was quite difficult. As a result, various types of metal and/or plastic motor mounts have been developed which mount to a firewall on the front of the fuselage and provide a pair of arms or jaws on which the engine is then mounted. Typically, these are secured to the firewall on the front of the fuselage using three or four screws. In general, separate mounts are provided for each size engine and in some cases, separate mounts provided for the same size engine from different manufacturers. Holes are either drilled by the user to match his engine or alternatively by the manufacturer after the type engine to be used has been specified. The result normally is that only one size engine and quite often only one size engine of a particular manufacturer can be used with a given motor mount. This offers severe disadvantages to the user. In the first place, after expending great quantities of time and effort to prepare for and get to a model airplane event, he can end up in a condition, if his engine fails, where he is not able to fly his aircraft even though other suitable engines are available. This is true since even if he can obtain a second engine of the proper size, if it is from a different manufacturer, it is very likely that the mounting holes will not match up with those holes in his motor mount. Furthermore, aircraft of this nature do occasionally crash and become damaged to the extent where they are no longer usable. In such a case, the user usually builds another aircraft. This may or may not be of the same size and may or may not use the same engine as his old aircraft. Unless he decides to use the same engine, the motor mount from the previous aircraft is no longer of use to him and he must purchase a new motor mount with holes drilled to suit the motor which he then plans to use.

Furthermore, presently available motor mounts are difficult to align accurately on the firewall of the fuselage, not being provided with any accurate guides for alignment. Particular difficulties can be encountered where it is desired to mount the engine at an angle which is not vertical or horizontal. In addition, some presently available motor mounts have a square base which sometimes make difficult the mounting of an engine cowling around the engine.

Thus, it can be seen that there is a need for a universal adjustable motor mount for use with model airplanes which will permit the modeller to use different engines with the same aircraft, and also to re-use his motor mount on more than one aircraft. In addition, such a motor mount should have provision for ease of alignment and mounting and should not form obstruction to the mounting of a cowling over the engine.

SUMMARY OF THE INVENTION

The motor mount of the present invention fulfills the above-noted requirements. It comprises a base member, preferably circular, having a channeled portion therein into which are inserted two adjustable jaws in a manner such that they can slide back and forth. Suitable screws are threaded into the jaws so that when the desired spacing for any particular engine is reached the jaws may be securely locked in place. The jaws themselves are slotted in a manner that permits alignment of the slots with the mounting holes of any engine within the range of engines for which the mount is designed. The mount described in the preferred embodiment is capable of mounting most engines of sizes between 0.15 and 0.80 cubic inches. Furthermore, the base is made with a central hole of, for example, a quarter-inch in diameter which may be used for ease of alignment with the base acting as its own template. In mounting the motor mount to the firewall of an aircraft, it is only necessary that the user drill an appropriate hole on the required centerline. Thereafter, a dowel may be inserted in this hole and the motor mount placed over the dowel. The motor mount is then rotated to whatever orientation is desired for the engine, whereupon marks may be made at its mounting holes and proper mounting holes drilled in the firewall to accurately mount the engine in the desired manner with relative ease. The same holes used in alignment may then be used to lead a fuel line from the engine back to the fuel tank located in the fuselage.

DETAILED DESCRIPTION OF THE PREFERRED EMBODIMENT

Figure 4:
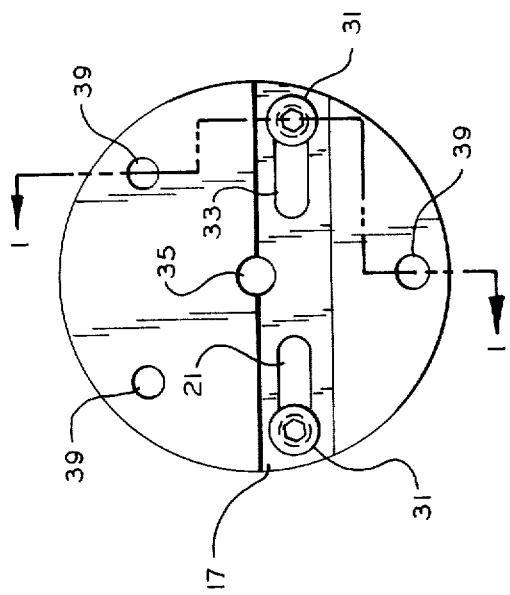
FIG. 4 is a rear elevation view of the motor mount.
Figure 1:
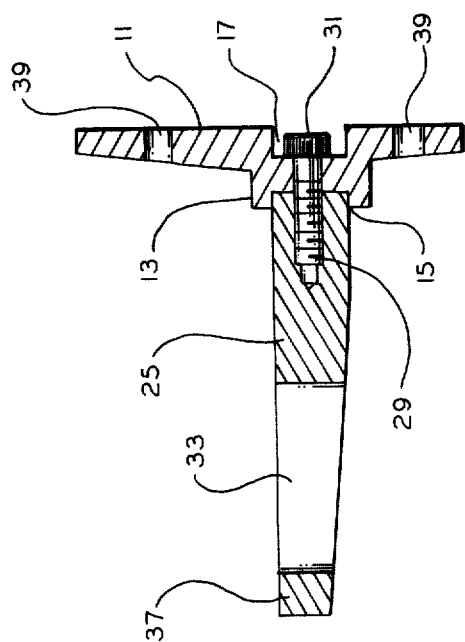
FIG. 1 is a cross-sectional elevation view of the motor mount of the present invention.
Figure 2:
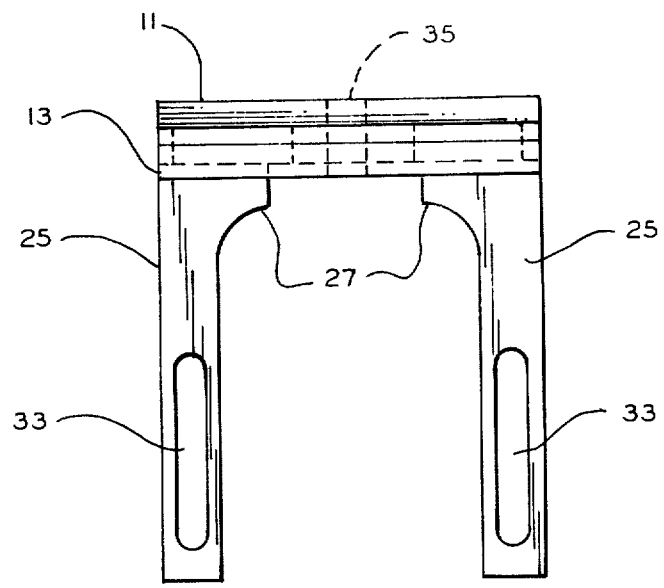
FIG. 2 is a plan view of the motor mount.
Figure 3:
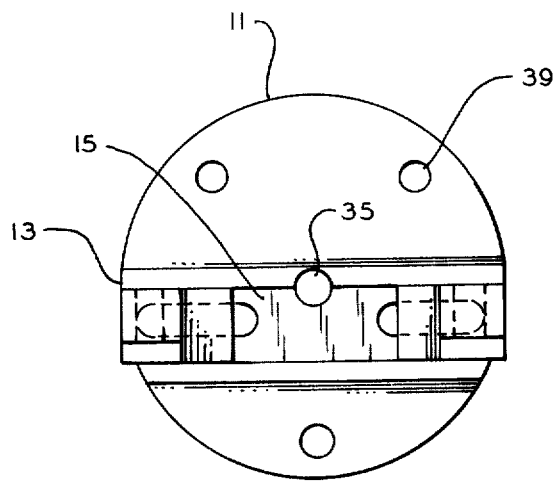
FIG. 3 is a front elevation view of the motor mount.

FIG. 1 is a cross-sectional view showing the section AA of the view of FIG. 4. FIG. 1 in conjunction with FIG. 2 shows the basic components of the present invention. A base member 11, which in the preferred embodiment is circular to ease problems associated with the mounting of an engine cowling is constructed with an essentially flat rear surface and a horizontal flanged portion 13 on its front. In the flange 13, a channel 15 is cut across its full width. A similar channel 17 is cut in the rear of the base member 11 as illustrated on FIGS. 1 and 4. Two slots 21 and 23 are cut through the base member from one channel to the other as illustrated. These slots are symmetrical about the vertical centerline of the base and are arranged to permit the required amount of adjustment. Two jaws 25 are provided which fit into the channel 15. These jaws will be sized so as to form a relatively tight fit therein but will still permit sliding motion. The jaws 25 have a flanged portion 27 at their base, as illustrated on FIG. 2, to increase their contact area with the channel 15. Each of the jaws 25 contains an internal threaded portion 29 with the jaw held in place in the channel 15 by means of a bolt 31. The forward portion of each jaw contains a slot 33 for use in mounting the airplane engine thereto. A hole 35 is drilled through the center of the base member 11. The top of the channel 15 passes through the center of hole 35. Thus, the top surface 37 of the jaws 25 will be in a plane passing through the center. This results, after mounting of an engine on the jaws, in the centerline of the engine being aligned with the center of hole 35. Also in the base 11 are three mounting holes 39 for mounting of the base of the firewall of the aircraft. Although shown as abutting directly with the channel 17, the bolt 31 may have a washer or preferably a flat washer and a lock washer inserted between it and the bottom of channel 17.

Mounting of the motor mount to the aircraft is relatively simple. A hole of the same size as hole 35 is drilled through the centerline on the firewall. The model maker from his plans can easily establish this centerline. After drilling this hole a dowel of appropriate size is inserted therein and the base of the motor mount placed thereover. If desired, the model maker may first mount the engine to the motor mount in the manner to be described below. The motor mount is then rotated until it is in the desired final position. That is, in some models the engine is mounted vertically with its cylinder pointing upwards, in others horizontally and in other cases at various angles between horizontal and vertical. With the motor mount of the present invention centered on a dowel, the model maker may very easily rotate the base 11 until the jaws 25 are in the desired position where he wishes to mount his engine. He may thereon mark the position of the three holes 39 and remove the mount and drill these holes as required. It should be noted that this can be accomplished before the model is completely finished. These holes may be established and drilled after which he may carry out finishing jobs such as painting and so on. Once the completed model is ready it is only necessary that he attach the motor mount using the pre-established holes. The hole left in the center through the motor mount and through the firewall may then be used to lead a gasoline line from the engine back to the fuel tank in the aircraft. In mounting the engine to the jaws 25, the model maker will first loosen the two screws 31 after which he will place the engine on top of the jaws adjusting them until the engine fits comfortably. Alignment marks may be provided on the base to aid in centering the jaws. He will then tighten the two screws 31 in place with the engine centered, whereupon he may mount the engine to the jaws using appropriate nuts, bolts and washers. Note that the slots 33 in addition to permitting the use of the motor mount with different engines also gives him a certain amount of lateral freedom of positioning.

Typical dimensions for a motor mount according to the present invention which is capable of handling most engine sizes in the range of 0.15 to 0.80 cubic inches would be as follows. The diameter of base 11 will preferably be about 2 ½ inches. This will permit freedom from obstructing with the cowling for all models taking engines of the above noted sizes. The channel 13 will be approximately ½ inch wide and 3/32 inch deep with a similar width and a depth of ⅛ inch for the channel 17. The width of slots 21 and 23 can be 3/16 of an inch with a length such as to permit adjustment of the jaws for spacings of from 1 inch to 2⅛ inches. The mounting holes 39 will preferably be on a 2 inch diameter circle from the center. The base portion of the jaws in contact with the channel 15 will be approximately ¾ inches wide with the mounting portion of the jaws approximately ⅜ inches wide and the slots therein approximately 1⅛ inches long and 3/16 inches wide.

Figure 5:
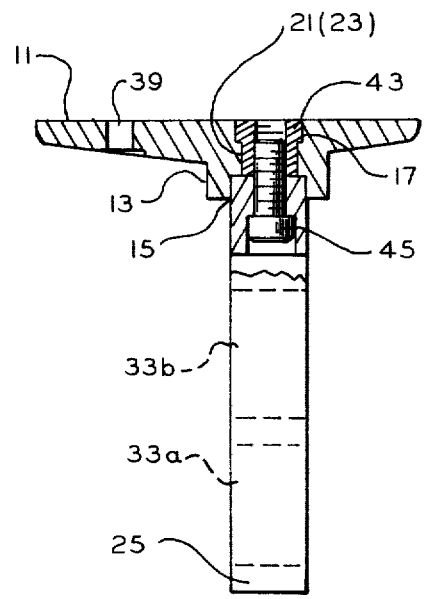
FIG. 5 is a view similar to that of FIG. 1, showing an alternate embodiment of the invention.
Figure 6:
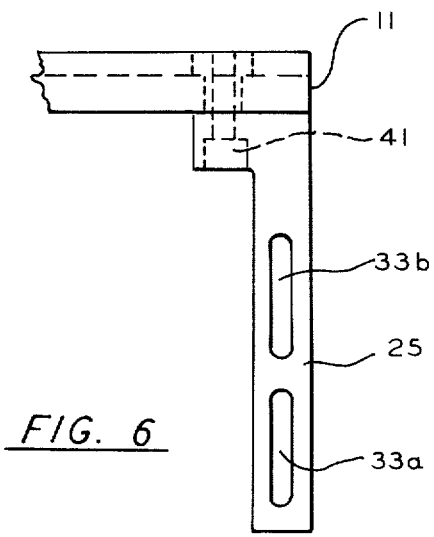
FIG. 6 is a partial plan view of the embodiment of FIG. 5.

FIGS. 5 and 6 illustrate a second embodiment of the present invention which offers certain advantages over that disclosed in connection with FIGS. 1 through 4. With the embodiment of FIGS. 1 through 4, once the bolts 31 are tightened down and the base mounted to the fuselage, adjustment of the jaws is no longer possible and replacement of the engine requires removing the mount from the fuselage. FIGS. 5 and 6 illustrate an embodiment in which jaw adjustment is possible along with engine changes while the motor mount remains attached to the fuselage. The base member 11 is essentially the same as that described above containing the channels 15 and 17 on the front and rear respectively with the channel 15 formed in the flanged area 13. The same type of mounting holes 39 are provided as in the previous embodiment. The main difference in this embodiment is the manner in which the jaws are attached to the base 11. In this embodiment, the enlarged portions 41 of the jaws 25 are each provided with a countersunk hole. This differs from the internal threading of the previous embodiment. A bushing 43 with a head which rests on the channel 17 and a portion which can slide in slots similar to the slots 21 and 23 of FIG. 4 is provided. It should be noted, that with the arrangement of FIGS. 5 and 6, the location of slots 21 and 23 will, of necessity, be closer to the center since the bolt 45 is closer to the center in this embodiment. The range of adjustment will be essentially the same as that described above. The bushing contains internal threads so that a bolt 45 may be inserted from the front through the countersunk hole 41, to engage the threaded bushing 43. With the bolt 45 loosened, the jaws 25 along with the bolt and bushing 43, are free to slide back and forth for jaw adjustment. After the engine has been placed on the jaws and proper adjustment made, the bolts 45 may be tightened from the front. This arrangement permits engine removal and replacement with a different engine without removing base member from the firewall of the fuselage. Also shown is a jaw 25 having two sets of slots designated 33a and 33b as opposed to the single slot 33 of FIGS. 1 through 4. This construction provides greater structural integrity, particularly when mounting larger engines. As noted above, the mount of the present invention is adapted to cover a large range of engine sizes. Because of this, the jaws necessary for larger engines may protrude farther than desired in some aircrafts, when used with smaller engines. For this reason, it is contemplated that the mount of the present invention can be packaged and sold with two sets of jaws, a long jaw such as that of FIG. 5 having an overall length of approximately 2 ¾ inches and a short jaw of approximately 1 ⅞ inches in length of a construction such as that shown on FIGS. 1 through 4.

Bench tests with the motor mount of the present invention using different sizes of engines have demonstrated that the above described construction, once all bolts are tightened down, results in a secure motor mount which securely holds the engine during all vibrations which normally occur. The preferred material for the motor mount of the present invention is aluminum although other metals and plastics may also be used. The parts may be diecast, sandcast or machined.

Thus, an improved adjustable motor mount for mounting model airplane engines has been shown. Although specific embodiments have been illustrated and described, it will be obvious to those skilled in the art that various modifications may be made without departing from the spirit of the invention which is intended to be limited solely by the appended claims.

What is claimed is:

1. An adjustable motor mount for model airplane engines comprising:
   a. an essentially flat base member having a regular shape and having a first channel formed in the surface of one side thereof with an edge of the channel passing through the center of said base member;
   b. first and second jaws slidably mounted in said channel, said jaws extending outward perpendicular to said base member a distance sufficient to permit mounting a model airplane engine thereon; and
   c. means for securing said jaws in place within said channel.

2. The invention according to claim 1 wherein said means for securing comprise internal threads on said jaws and a bolt inserted from behind base into said internal threads and wherein said base further includes a second channel on the side of said base opposite said first channel and aligned therewith and first and second slots extending from the bottom of one channel to the other channel through which said bolt may be inserted into said jaws.

3. The invention according to claim 1 and further including a locating hole through the center of said base.

4. The invention according to claim 1 wherein said base further includes a second channel on the side of said base opposite said first channel and aligned therewith and first and second slots extending from the bottom of one channel to the other channel and wherein said means for securing comprise holes at the base of said jaws and bolts inserted through said holes and threaded bushings placed in said slots with a head portion in said channel and engaging said bolts.

5. The invention according to claim 4 wherein said base contains a flanged portion across its width and said first channel is formed in said flanged portion.

6. The invention according to claim 5 wherein said jaws have an enlarged portion at the point where they are inserted in said channel, said holes being in said enlarged portion.

7. The invention according to claim 6 and further including at least one elongated slot at the outside end of each of said jaws.

8. The invention according to claim 7 wherein each of said jaws has a pair of slots formed therein.

9. The invention according to claim 7 wherein said base is of a circular shape.

10. The invention according to claim 9 and further including a plurality of mounting holes in said base.

11. The invention according to claim 10 wherein said mounting holes are on a circle having its center at the center of said base.

12. The invention according to claim 11 wherein three mounting holes are provided.

13. The invention according to claim 12 wherein said base and said jaws are made of aluminum.

14. The invention according to claim 4 and further including a locating hole through the center of said base.

* * * * *